Figure 1:
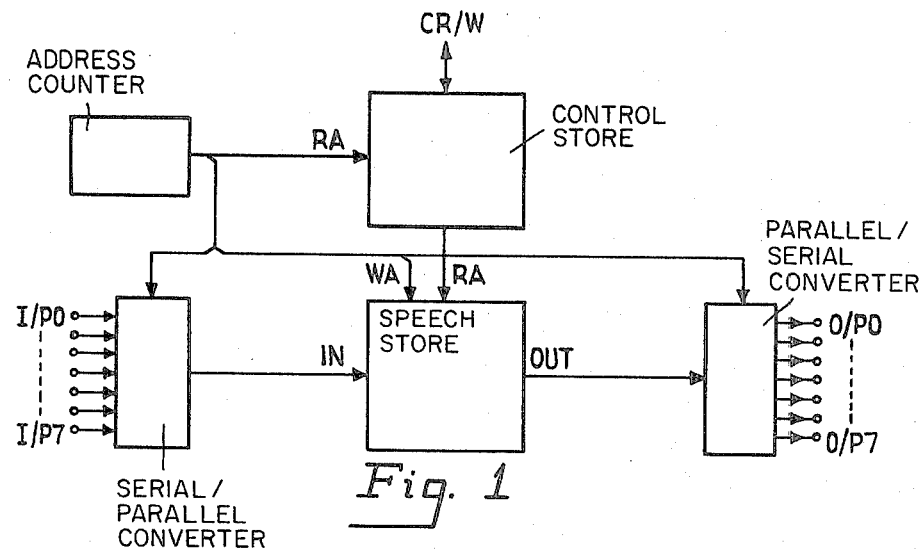

United States Patent [19]

Hesketh

[11] 4,392,221

[45] Jul. 5, 1983

[54] TIME DIVISION MULTIPLEX MODULE FOR USE IN DIGITAL SWITCHING NETWORK

[75] Inventor: Truman H. Hesketh, Maidenhead, England

[73] Assignee: Plessey Overseas Limited, Ilford, England

[21] Appl. No.: 184,367

[22] Filed: Sep. 5, 1980

[30] Foreign Application Priority Data

Sep. 8, 1979 [GB] United Kingdom ............... 7931231

[51] Int. Cl.³ ............................................. H04Q 11/04
[52] U.S. Cl. ........................................ 370/54; 370/58; 370/64
[58] Field of Search ..................... 370/54, 64, 58, 66

[56] References Cited

U.S. PATENT DOCUMENTS

| | | | |
|---|---|---|---|
| 3,743,789 | 7/1973 | Krupp | 370/54 |
| 3,860,761 | 1/1975 | O'Neill | 370/54 |
| 4,022,982 | 5/1977 | Hemdal | 370/54 |
| 4,201,891 | 5/1980 | Lawrence et al. | 370/58 |

FOREIGN PATENT DOCUMENTS 1252526 11/1971 United Kingdom.

*Primary Examiner*—Douglas W. Olms
*Attorney, Agent, or Firm*—Fleit, Jacobson & Cohn

[57] ABSTRACT

A time division multiplex switching module consisting of a serial-to-parallel multiplexer, a speech store, a parallel-to-serial demultiplexer and a control store serving eight incoming and eight outgoing t.d.m. lines. The module has a code detector, located on its input side, for detecting a mark code, and a code generator, located on its output side, for generation either the mark code or idle code. Control words in the control store include two extra bits, an input busy bit and an output busy bit to indicate busy paths through the module. When a mark code is detected by the code generator on a particular incoming line a mark present bit is set in a register (one of six) and the code generator is caused to generate mark codes on all the free outgoing lines. A number of modules are incorporated in a digital switching network arranged in the form of an array and a path can be set-up through the array.

7 Claims, 3 Drawing Figures

TIME DIVISION MULTIPLEX MODULE FOR USE IN DIGITAL SWITCHING NETWORK

The present invention relates to a time division multiplex (t.d.m.) module for use in a multi-stage digital switching network.

With the increasing use of digital transmission of speech telephony, a natural development is to switch traffic of this type in a digital switch. There are many known varieties of digital switch and one type consisting of arrays of identical modules is described in the IEEE. Proceedings 1978-International Zurich seminar on digital communications:- "Development of a time division switching network usable in a very large range of capacities" P. Charransol, J. Hauri, C. Athenes, D. Hardy.

An aim of this invention is to provide a time division multiplex module which incorporates path selection facilities.

According to the present invention there is provided a time-division multiplex switching module for use in a multi-stage digital network, the module comprising a plurality of inlet multiplex paths and a plurality of outlet multiplex paths, a plurality of register means, one for each inlet multiplex path respectively, a code detector means for detecting the presence of a mark code on the inlet multiplex paths, and a code generator means for generating either an idle code or a mark code, in which, when a mark code is detected by the code generator on a particular inlet multiplex path, a mark present bit is set in the register means appropriate to the particular inlet path, whereupon the code generator generates mark codes which are then transmitted on all free outlets of the module.

Figure 3:
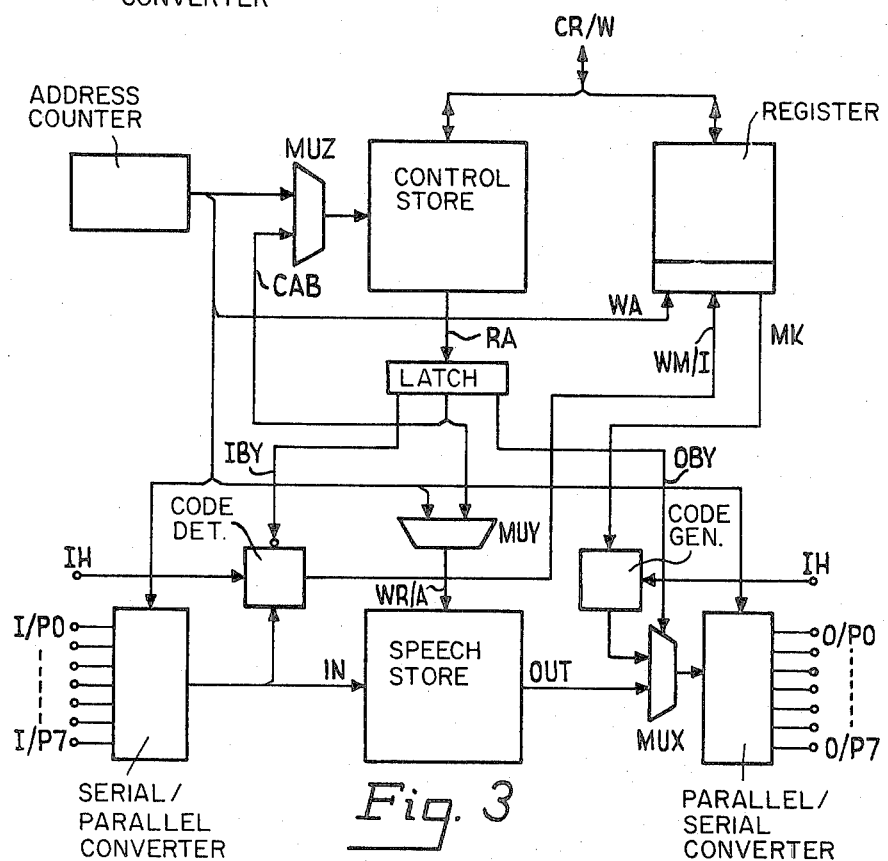
Figure 2:
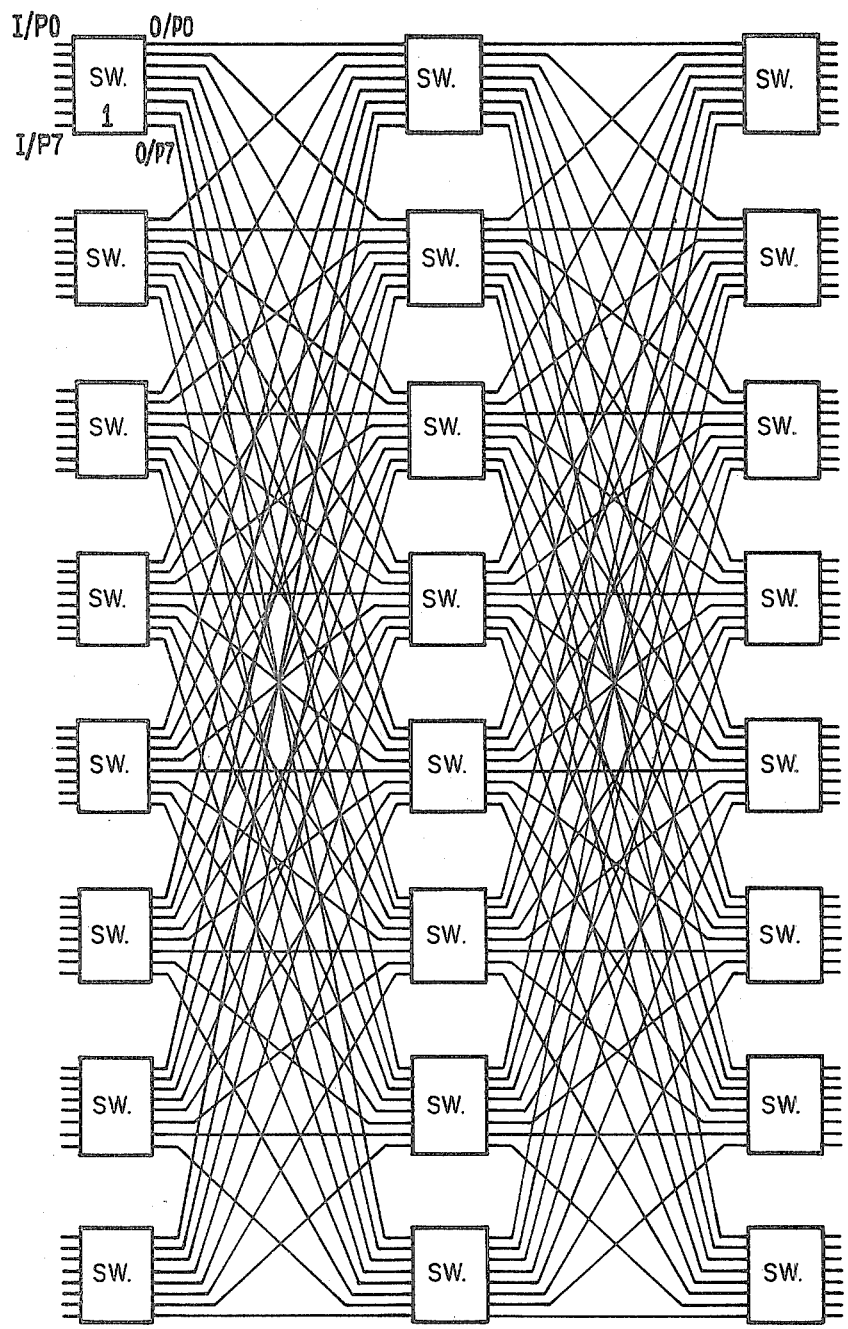

The invention will be more readily understood from the following description of an exemplary embodiment which should be read in conjunction with the accompanying drawing in which, FIG. 1 illustrates in block schematic form, a digital switch module in accordance with known art;

FIG. 2 illustrates a schematic diagram of a larger switching arrangement incorporating an array of interconnected digital switch modules, and FIG. 3 illustrates a block schematic diagram of a digital switch module in accordance with the present invention.

Referring firstly to FIG. 1, there is illustrated an 8×8 module which consists of an input serial-to-parallel converter S/P, a 256 word×8 Bit speech store SS, an output parallel-to-serial converter P/S, a 256 word×8 bit control store CS, and an address counter CTR. Each input multiplex path I/P 0 to I/P 7 carries a 32 channel, 8 bit per sample, pulse code modulation (p.c.m.) multiplex conforming to CCITT standards (in transmission systems the standard reserves two channels for synchronisation and signalling purposes, so it is usually referred to as a 30 channel system, but within a switch, all 32 channels may be used). The serial-to-parallel converter S/P converts the serial data stream to an 8 bit parallel form, channel by channel, interleaving the 8 inputs cyclically. In the 8×8 module, this gives a word rate equal to the input bit rate, which simplifies the module construction.

The 8-bit words are written sequentially into the speech store SS which is addressed over path WA, so that a particular word in the speech store SS always contains the latest sample of a particular channel within a particular input multiplex. The words are read from the speech store SS in a different sequence, specified by the sequence of addresses stored in the control store CS (path RA, latch L, multiplexor control logic MUY and path WR/A are concerned), and the parallel-to-serial converter P/S distributes these words cyclically to the output multiplex paths O/P 0 to O/P 7, then converts them to serial form. Thus, a particular word in the control store refers to a particular outlet (channel within output multiplex) and its contents specify which inlet (channel within input multiplex) is connected to it. Accordingly, any free inlet can be connected to a free outlet by writing a word in the control store CS, irrespective of how the rest of the module is connected.

The 8×8 module provides 256 inlets and outlets (32 channels×8 multiplexes). However, larger switches may be constructed by connecting the modules (one designated SWU1) in an array, as shown in FIG. 2 to form a multi-stage network. To set-up a path through such an array or network, requires that the control device (not shown) inserts the appropriate control word in the control store of each module on the chosen path by way of path CR/W. This is quite straight-forward once it has been determined that a free path exists and which of the many possible paths it is. In the device previously discussed, this can only be done by searching possible paths successively until a free path is found. This can be quite time-consuming, even though the control stores can be read and written at electronic speeds.

Referring now to FIG. 3, the purpose of the present invention is to provide a built-in aid to path selection in such a network. To achieve this, the control store word length is increased from 8 bits to 10 bits (in the 8×8 example), a code detector CD is connected to the speech store SS input, a code generator CG is connected so that it can substitute special codes instead of the speech store output. A set of eight 6-bit registers MREG to store the results of path search probes is also provided.

One of the extra control word bits, the output busy bit OBY, indicates, when set, that the corresponding module outlet is carrying traffic. When this bit is not set, then the code generator substitutes an idle code for the speech store output. Idle code corresponds to one of the lowest amplitudes of speech.

The other extra control word bit, the input busy bit IBY, unlike the rest of the control word, is associated with the corresponding module inlet. This correspondence exists because the control words are read in the same cyclic order as the speech codes are written into the speech store SS. As a consequence, it is appropriate that the input busy bit is automatically set to conform to its related output busy bit. Thus, when the control device rewrites a control store word, setting the output busy bit, then, when that control store word is next read out, it is temporarily stored in a latch L, and the control and address portion of the control word is fed back by way of path CAB and the multiplexor control logic MUZ to the control store CS to permit the related input busy bit IBY to be set.

Similarly, when a connection is cleared down, the control device clears the output busy bit only, and when that control store word is next read, the related input busy bit will be cleared.

It will be seen that the input busy bits IBY disable the code detector CD so that it is permitted to function only on channels that are free, i.e. not carrying traffic.

The code detector CD detects the presence of mark code at the input IN of the speech store SS. Mark code is a specific 8-bit code distinct from idle code. If the code detector CD is not inhibited, and mark code is detected, then one of the eight 6-bit mark registers MREG is loaded from the control. The register to be loaded is selected by the 3 least significant bits of the address counter CTR, accordingly it will be apparent that each register corresponds to a particular multiplex input line.

At the same time, one bit of the register, the 'mark present' bit, is set to 1 by way of path WM/I to indicate that a mark code has been detected, while the remaining 5 bits are loaded from the 5 most significant bits of the address counter CTR. These bits indicate the number of the timeslot in which the mark code was detected.

It is important to note that if a whole multiplex frame period elapses without a valid mark code being detected on an input path, the corresponding 'mark present' bit is cleared. The mark registers MREG are accessible via the control interface (path CR/W), however, while the whole register may be read, only the 'mark present' bit may be written. The code detector DC may also be inhibited by an external input IH, in which case 'mark present' bits can only be set and cleared by the control (not shown).

If any of the 'mark present' bits are set, then the function of the code generator CG is altered so that it outputs mark code to the multiplexor control logic MUX instead of idle code. The generation of mark codes can be inhibited by an external input IH. If mark codes are not inhibited, then the presence of a mark code at a module input, will cause mark codes to be transmitted to all free outlets, i.e. on all outlets that are accessible from that inlet. The use of this mechanism is as follows:

In the network array, it is arranged that all modules in the first column have their code detectors CD inhibited, and all modules in the last column have their code generators CG inhibited. This confines generated mark codes within the array. To connect a particular inlet to a particular outlet, the control sets the 'mark present' bit corresponding to the desired inlet in the first column module containing that inlet. Marks now propagate on all free paths from that inlet through the network array.

The control now examines the registers MREG of the last column module containing the desired outlet, for a 'mark present' bit set. If such a bit is found, then a free path exists. A path can then be set up by setting the control store word corresponding to the desired outlet to connect to the marked inlet. The busy bit is also set.

From a knowledge of the array interconnections (e.g. contained in a table in its memory), the control can now determine which module in the preceding column, and which outlet in that module, was the source of the mark. This process is now repeated in that module, and then the preceding module, until the path has been set up right back to the desired inlet. Clearing the 'mark present' bit in the first column module now clears the marks from the network array, ready for the next path search.

It will be observed that this method of using the speech paths themselves for marking free paths minimises the number of extra connections to the module, which is particularly important if integrated circuit implementation is adopted. The use of this method to select a path in an n-stage switch requires just $5n$ control accesses to the modules. Without this method, the number of accesses required increases with the traffic, approaching $128\ n^2$ for a heavily loaded switch.

What we claim is:

1. A time-division multiplex switching module for use in a multi-stage digital network, the module comprising a plurality of inlet multiplex paths and a plurality of outlet multiplex paths, a plurality of register means, one for each multiplex input path respectively, a code detector means for detecting the presence of a mark code on the inlet multiplex paths, and code generator means for generating either an idle code or a mark code, in which, when a mark code is detected by the code detector on a particular inlet multiplex path, a mark present bit is set in the register means appropriate to the particular inlet path, whereupon the code generator generates mark codes which are then transmitted on all free outlets of the module.

2. A time-division multiplex switching module as claimed in claim 1 in which the code detector is connected to a path extending between a serial-to-parallel converter, connected to the input multiplex paths, and a speech store.

3. A time-division multiplex switching module as claimed in claim 2, in which the speech store outputs to a parallel-to-serial converter, connected to the output multiplex paths, and the code generator is adapted to substitute either a mark code or an idle code instead of the speech store output to the output multiplex paths.

4. A time division multiplex switching module as claimed in claim 3, in which a control store includes control words each of which incorporate two separate bits for storage of an input busy bit and an output busy bit respectively.

5. A time division multiplex switching module as claimed in claim 4, in which when a control word is rewritten, the output busy bit is set, and when that control word is next read out of store, it is temporarily stored in a latch means whereupon an address portion of the control word is fed back to the control store and the input busy bit is set.

6. A time division multiplex switching module as claimed in claim 5 in which when the input busy bit is not set and a mark code is detected on the path between the serial-to-parallel converter and the speech store, then an appropriate register is detected and loaded with information including the mark present bit.

7. A time division multiplex switching module as claimed in claim 6, in which when the output busy bit is set the presence of mark present bit in the register causes the code generator to substitute mark code to the output multiplex paths.

* * * * *